United States Patent
Schletterer

(10) Patent No.: US 6,560,045 B1
(45) Date of Patent: May 6, 2003

(54) ELASTIC LENS HOLDER

(75) Inventor: Thomas Schletterer, Ossmannstedt (DE)

(73) Assignee: Jenoptik Aktiengesellschaft, Jena (DE)

( * ) Notice: Subject to any disclaimer, the term of this patent is extended or adjusted under 35 U.S.C. 154(b) by 0 days.

(21) Appl. No.: 09/684,050

(22) Filed: Oct. 6, 2000

(30) Foreign Application Priority Data

Oct. 6, 1999 (DE) .......................................... 199 48 640
Aug. 24, 2000 (DE) .......................................... 100 43 344

(51) Int. Cl.$^7$ ................................................. G02B 7/02
(52) U.S. Cl. ........................ 359/819; 359/818; 359/819; 359/830
(58) Field of Search ................................. 359/808, 819, 359/818, 830, 813; 396/529; 248/637

(56) References Cited

U.S. PATENT DOCUMENTS

| | | | | |
|---|---|---|---|---|
| 2,808,762 A | * | 8/1957 | De Grave | 359/830 |
| 3,542,575 A | | 11/1970 | Nelson | 524/548 |
| 3,601,343 A | * | 8/1971 | Sivaslian | 248/637 |
| 3,904,276 A | | 9/1975 | Whitaker et al. | 359/819 |
| 3,989,358 A | * | 11/1976 | Melmoth | 359/813 |
| 4,778,252 A | | 10/1988 | Filho | 359/819 |
| 4,854,671 A | | 8/1989 | Hanke et al. | 359/820 |
| 5,754,350 A | | 5/1998 | Sato | 359/818 |
| 6,307,688 B1 | * | 10/2001 | Merz et al. | 359/819 |

FOREIGN PATENT DOCUMENTS

| | | |
|---|---|---|
| DE | 1 814 569 | 7/1960 |
| DE | 28 46 241 | 5/1980 |
| DE | 86 25 896 | 1/1987 |
| DE | 35 21 640 | 12/1996 |
| DE | 196 32 267 | 2/1997 |
| DE | 196 23 418 | 12/1997 |
| JP | 60 230609 | 11/1985 |

OTHER PUBLICATIONS

*English Translation of DE 1 814 569 Abstract only.
*English Translation of JP 60 230609 Abstract only.
*English Translation of DE 196 32 267 Abstract only.
*English Translation of DE 35 21 640 Abstract only.
*English Translation of DE 28 46 241 Abstract only.
*English Translation of DE 86 25 896 Abstract only.
*English Translation of DE 196 23 418 Abstract only.

* cited by examiner

Primary Examiner—Georgia Epps
Assistant Examiner—Gary O'Neill
(74) Attorney, Agent, or Firm—Reed Smith LLP

(57) ABSTRACT

Elastic lens holder with a lens mount and a lens, an annular groove being constructed on the circumferential surface of the lens, and there being present at the lens mount elastic segments whose free ends engage radially under pretension in the annular groove.

7 Claims, 4 Drawing Sheets

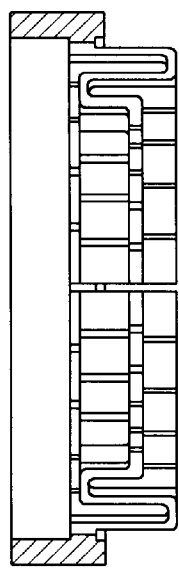
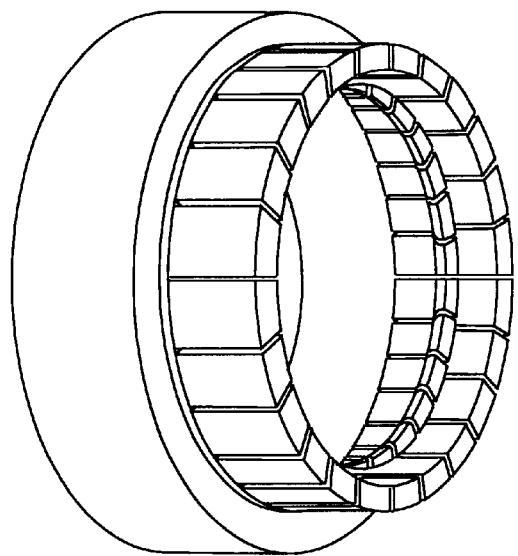
F I G. 2A    F I G. 2B
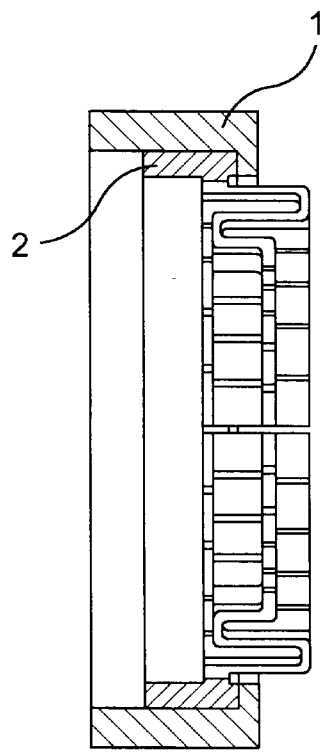
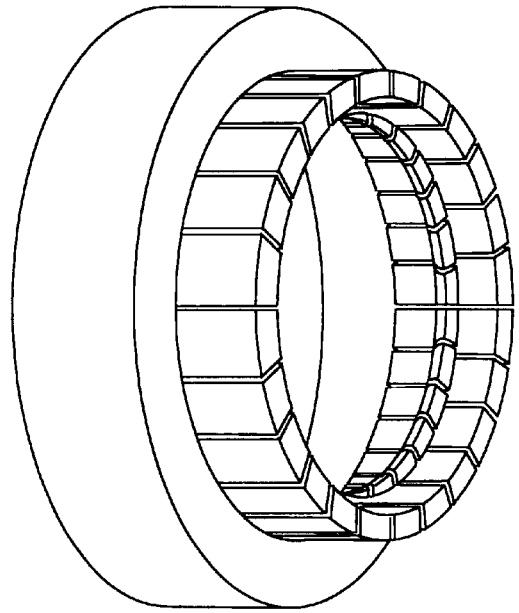
F I G. 3A    F I G. 3B

ELASTIC LENS HOLDER

BACKGROUND OF THE INVENTION a) Field of the Invention

The invention relates to a lens holder comprising a lens and a lens mount in which the lens is elastically mounted in the radial fashion over the circumferential surface of the lens.

b) Description of the Related Art

Such an embodiment is known in the widest sense from German patent application DE 35 21 640.

Mounting the optical elements with low stresses is a central problem in the development of UV high-performance lenses. Mounting with low stresses is taken to mean that as far as possible the optical element experiences no deformation through the mount itself, and that dynamic and thermal loads do not lead to any strains or to maladjustment of the optical element.

A multiplicity of arrangements are known from the prior art for the purpose of solving this problem, and in these cases an optical element such as a lens is held in a mount with the aid of elastic means.

For example, German patent application DE 28 46 241 A1 discloses an arrangement in which a lens guided radially in its mount is pressed axially against a fixed bearing surface by at least two platelets engaging over the end region of the lens. The platelets are made from an elastic material and are held in a self-closed fashion in the mount in such a way that they bear under pretensioning against the lens.

A thermal expansion of the lens in the axial direction can be compensated by the axially elastic bearing of the lens. Likewise, dynamic loads can be damped. In order also to permit radial thermal expansion of the lens without the occurrence of radial stresses in the lens, which can lead to dramatic worsening of the optical imaging, there must be adequate play in the fitting of the mount and of the lens as a function of the different coefficients of thermal expansion. However, within this play of the fitting maladjustments can occur under the action of radial dynamic loads.

German utility model G 86 25 896 describes a second axially elastic holder for optical components in a mount. Here, the elastic holding element is in the form of a closed ring which bears against the mount in the edge region of the lens, on the one hand, and in a groove provided for the purpose, on the other hand.

A disadvantage of this solution is that dynamic loads are transmitted virtually undamped onto the lens via the ring, which is rigid in the radial direction.

As in the solution previously mentioned, the spring forces act to hold the lens on the optically effective face. Since the absolute value of the spring force changes as a function of the thermal expansion of the lens, changed states of stress occur in the lens which fail to meet the high requirements placed on the imaging quality, in particular in the case of high-performance lenses. DE 196 32 267 A1 discloses a lens holder in the case of which locating noses constructed on the lens mount bear in an engaging groove constructed on the lens (including a cemented lens cluster), in order to hold the lens in the mount in a self-closed fashion. In the case of a cemented lens cluster, the engaging groove is formed by the phase surfaces meeting at the cemented surface. In the case of an individual lens, the engaging groove is not an actual groove but a phase surface of the lens. The position of the lens inside the mount is determined in the radial direction by a play in the fitting between an inner circumferential surface of the lens mount and an outer circumferential surface of the lens, and in the axial direction by pressing the edge region of an end face of the lens against a holding projection of the mount.

The mount is neither thermally nor mechanically stable. In the case of expansion and shrinkage of the lens material as a consequence of a thermal load, there is necessarily a relative displacement with respect to the mount, and therefore friction, on the one hand, on the bearing surface of the locating noses in the engaging groove of the lens and, on the other hand, on the bearing surface of the holding projection on the end face of the lens. The backsliding caused by the friction has the effect that the displacement takes place in an undefined fashion and the lens does not return to its initial position. For high-performance lenses, such a maladjustment is already capable of substantially reducing the imaging quality. The additional securing of position by means of adhesive renders the lens holder unsuitable for UV radiation.

Mechanical loads such as shocks are transmitted onto the lens without being damped in the radial direction. Another disadvantage is that pressures act on the lens via its optically active end face, and this can lead to deformation of the lens.

German patent application DE 35 21 640 A1 discloses a holder which is elastic in the radial direction. It comprises at least three ribs which are preferably provided distributed uniformly on the cylindrical circumferential surface of the lens and are made from a highly elastic material, advantageously from silicone rubber. These are compressed when the lens is installed in the mount. The mount and the lens can expand differently without impedance in the axial direction owing to the only slight indirect contact surface between the mount and the lens on the circumferential surface of the lens.

The centering of the lens in its mount is always ensured independently of thermal and dynamic loads. It is also advantageous that the forces acting act on the circumference and not on an optically effective face. In order to improve the positional stability, it is proposed to make use of a retaining ring, likewise provided with elastic ribs, or a plug-in ring, which is to be bonded in, which fixes the lens additionally in the axial direction. This becomes indispensable for lenses of relatively large mass, and signifies additional outlay on mounting.

However, it is not possible to make use for high-performance lenses, which require UV resistance because of the radiation used, of any organic materials such as, for example, adhesives, potting compounds, silicone rings and similar materials, since these decompose in the long term under the action of UV radiation and constitute a contamination risk. It follows that indirect elastic mounting using organic materials, such as is known from DE 35 21 640, is not suitable for high-performance lenses.

OBJECT AND SUMMARY OF THE INVENTION

It is the primary object of the invention to create a lens holder which is suitable, in particular, for UV lenses and in the case of which the lens is held elastically in a radial fashion at its circumferential surface. Moreover, the lens holder is to have a shape such that the lens can be mounted easily and quickly and can also be effectively rinsed in the mounted state.

The invention achieves this object for a lens holder by virtue of the fact that an annular groove is constructed on the circumferential surface of the lens and the elastic elements are segments which are formed on the lens mount and whose free ends engage radially in the annular groove, and the lens is held radially and axially exclusively via this connection.

The formation of radially elastic segments on the lens mount itself creates a lens mount in which a lens can be mounted with low stresses, directly and without additional means on its circumferential surface.

The geometry of the segments is variable and can therefore be adapted in coordination with the material constants of the mount, the dimensioning of the segments and the desired spring stiffness to the existing space conditions for the lens mount.

The segments are of the same dimensions and engage in a radially uniformly distributed fashion in the annular groove introduced on the circumferential surface, with the result that the lens itself is centered in the lens mount. The spring stiffness of the individual segments, and the pretensioning force exerted by them on the lens are the same. The annular groove lies in a radial plane.

The different thermal expansions of the lens mount and the lens are compensated in the radial direction via the spring action of the segments, while there is no need for compensation in the axial direction, because the contact is only linear.

By virtue of the fact that the lens is connected to the mount exclusively via the elastic segments, dynamic loads are transmitted to the lens only with damping.

It is advantageous according to the invention when the annular groove is introduced in the radial plane of the lens in which a radial action of force effects the slightest bending of the optically effective faces of the lens. This plane is determined by means of the so-called finite element method.

The cross section of the groove is advantageously V-shaped with one radius formed in the apex. It is advantageous when a larger radius is formed at the free ends of the segments with the result that the free ends come to bear in the V-groove against the edges thereof.

BRIEF DESCRIPTION OF THE DRAWINGS

Five exemplary embodiments which utilize the invention are explained in more detail below with the aid of the drawing, in which:

FIGS. 2A and 2B show a second embodiment;

FIGS. 3A and 3B show a third embodiment;

DESCRIPTION OF THE PREFERRED EMBODIMENTS

A lens mount according to FIGS. 1 to 3 is viewed in the axial direction, formed at its first end as a closed ring, while at its second end the closed ring shape is raised by a multiplicity of slots running in the axial direction. This slotted end constitutes an annular arrangement of identically dimensioned segments which can be differently shaped according to the invention for the individual embodiments.

The first end of the lens mount can likewise be differently shaped, depending on the structural configuration of the housing into which the lens mount is, if appropriate, to be introduced. The first end is constructed using expert knowledge in accordance with the required connecting conditions and is not intended to be the subject matter of the invention.

Different designs of the segments lead to a different cross section of the lens mount in the region of the slotted end.

Figure 1C:
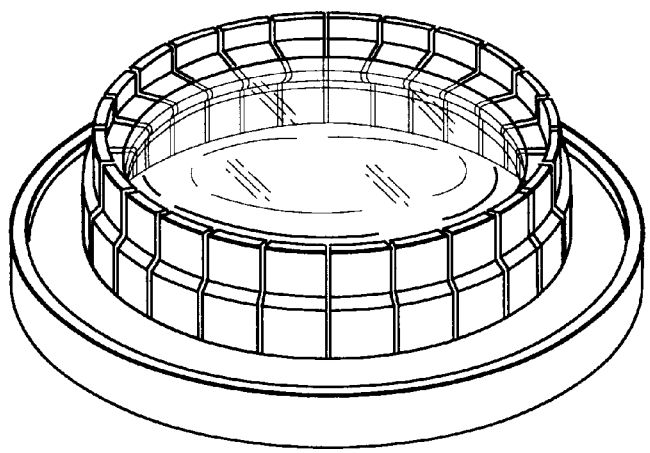
FIGS. 1A to 1C show a first embodiment.
Figure 1B:
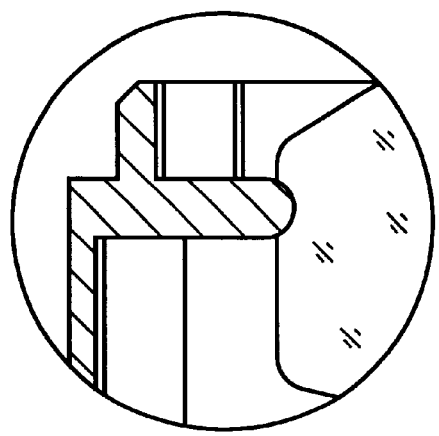
Figure 1A:
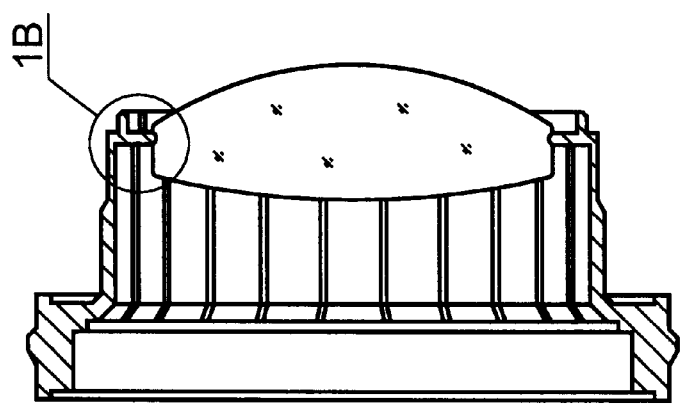

A first embodiment is illustrated in FIGS. 1A to 1C. The segments are of plate-shaped form and are angular only at their free end. A reinforcement is constructed in the region of the angle. The thickness, the length and the width of the segments are selected as a function of a desired bending characteristic and of the material of the lens mount. As may be seen from FIG. 1, the thickness can also differ over the length. The segments illustrated here are arranged in each case parallel to the axis of symmetry. They could equally run angularly.

A second embodiment is illustrated in FIGS. 2A and 2B. Here, the length of the segments is reduced by a meandering formation. However, in order to shorten the lens mount in the axial direction in such a way it is necessary for it to have a design with a larger diameter. Here, as well, the concrete structural dimensioning can lend the segments a desired bending moment characteristic.

The mount can also be of bipartite form in order to be more independent in the selection of material for the segments. A third embodiment is illustrated for this purpose in FIGS. 3A and 3B. Thus, the first end of the lens mount can consist of a material which can be machined effectively (for example for the purpose of precision turning), while a material of higher elasticity is used for the second end.

The slot produced by the segmentation permits the lens to be rinsed in the mounted state.

In order to mount the lens in the lens mount, the segments are simultaneously spread apart using an aid provided for the purpose, and a handle is used to insert the lens. There is no need for additional means to secure the lens position, and so the mounting is quick and uncomplicated.

Figure 4:
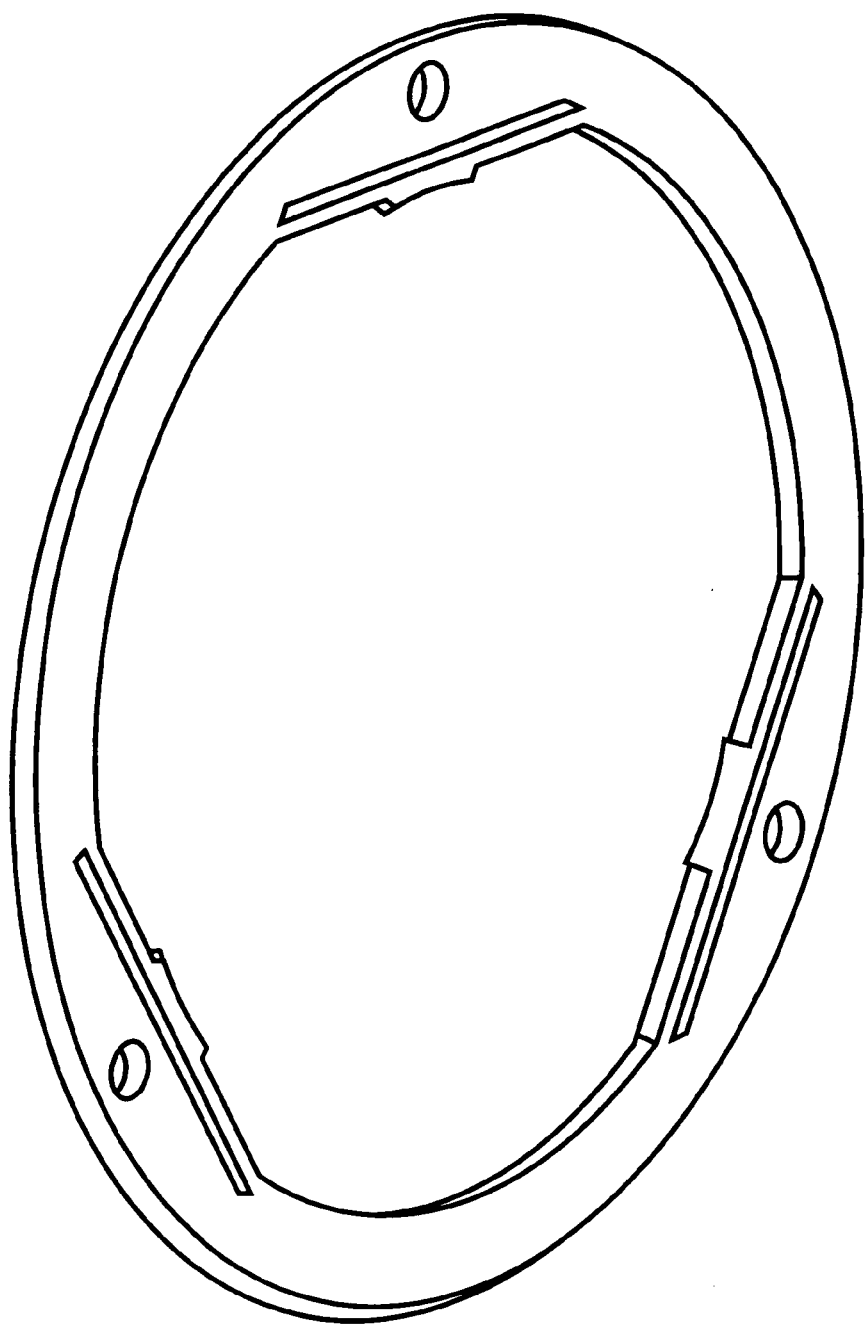
FIG. 4 shows a fourth embodiment.

A design which saves even more space is illustrated for a lens mount in FIG. 4. Present here as elastic segments are three formations in the shape of circular segments on the inner circumference of the mounting ring, which lie in a plane with the annular groove. A resilient action is achieved for these segments by slots introduced in the tangential direction. Constructed in the middle of the slots on the formations are attachments which are adapted in shape to the annular groove. By comparison with that previously described, this design has the advantage that the space requirement for the lens holder is no longer determined in the axial direction by the dimensioning of the elastic segments.

Figure 5:
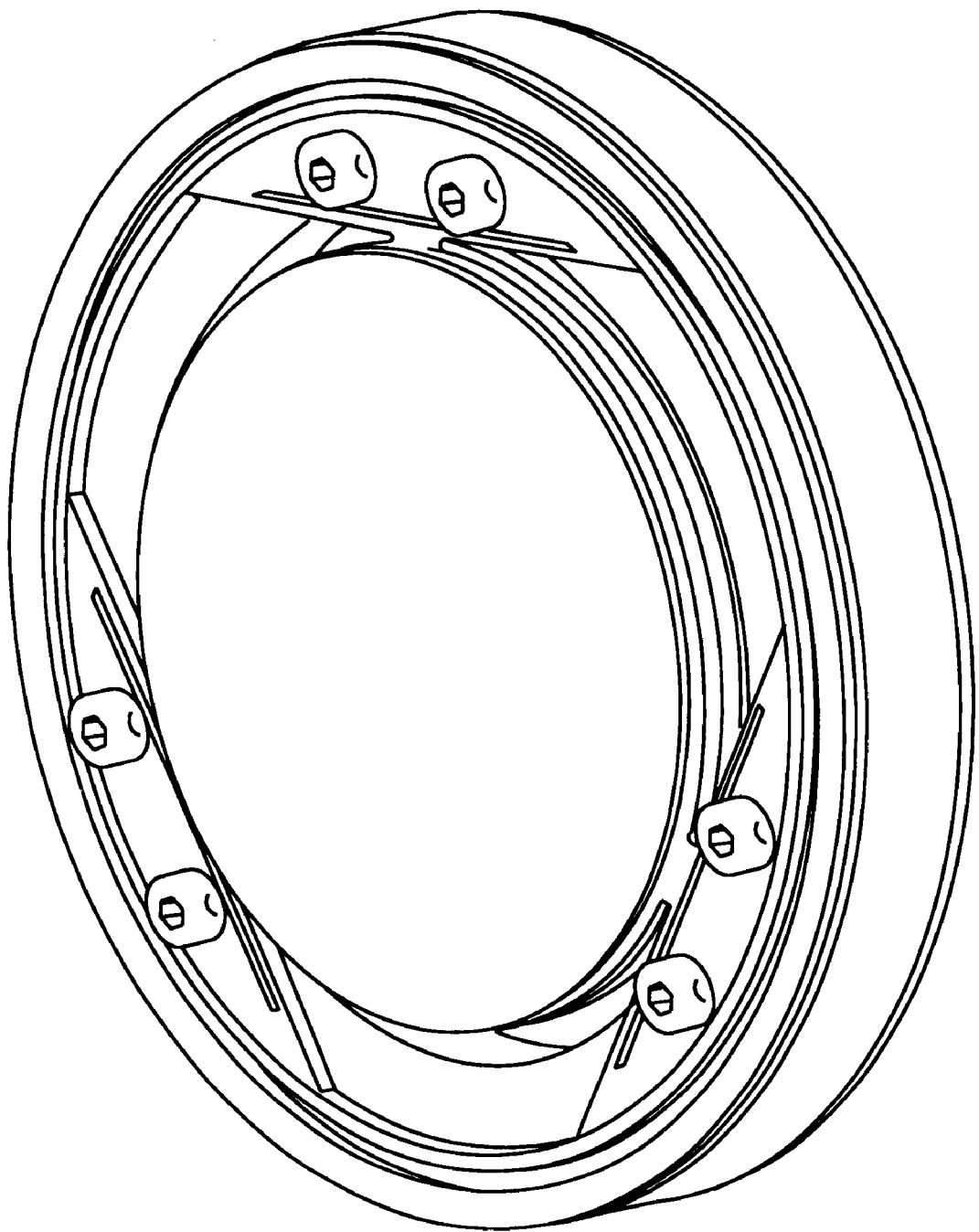
FIG. 5 shows a fifth embodiment.

In the exemplary embodiment illustrated in FIG. 5, the segments are individual plates which are in the form of circular segments and are detachably connected to the mounting ring on an end face thereof via a screw connection. They act like the segments described in the fourth exemplary embodiment, but have two noteworthy advantages. On the one hand, this design is easier to mount, since there is no need to spread all the segments in order to insert the lens, but it is possible with only two segments mounted to insert the third segment easily and subsequently fasten it. On the other hand, the segments can be fitted on a mounting ring on both end faces thereof (not illustrated in the drawing), in order to hold two individual lenses with one lens mount. The required spacing of the lenses relative to one another then determines the thickness of the mounting ring.

The mounting ring need not, of course, be a plate-shaped ring, but can also have an inner collar against whose end faces the segments bear. Likewise, the segments can also be fitted in a circumferential groove in the mounting ring. It is important only that they all bear against the mounting ring in one radial plane so that the action of their force is ensured in the same plane. The number of the segments can also be selected to be higher. Likewise, other mechanical connections are also possible between the segments and the mounting ring.

While the foregoing description and drawings represent the preferred embodiments of the present invention, it will be obvious to one skilled in the art that various changes and modifications may be made therein without departing from the true spirit and scope of the present invention.

What is claimed is:

1. An elastic lens holder comprising:

a lens mount and a lens against whose circumferential surface elastic, pretensioned elements bear;

an annular groove being constructed on the circumferential surface of the lens;

said lens mount being formed by a mounting ring and said elastic elements;

said elastic elements being segments which in each case have a fixed end, connected to the mounting ring, and a free end which engages radially in the annular groove and holds the lens radially and axially;

wherein the segments form a ring which is closed on the side of the fixed ends and is slotted in the axial direction on the side of the free ends.

2. The elastic lens holder as claimed in claim 1, wherein the annular groove lies in a radial plane of the lens in which acting forces effect the slightest bending of the optically effective faces of the lens.

3. The elastic lens holder as claimed in claim 1, wherein the annular groove is V-shaped with one radius formed in the apex, and a larger radius is formed at the free ends of the segments with the result that the free ends come to bear in the V-groove against the edges thereof.

4. The elastic holder as claimed in claim 1, wherein the closed annular region constitutes the mounting ring.

5. An elastic lens holder comprising:

a lens mount and a lens against whose circumferential surface elastic, pretensioned elements bear an annular groove being constructed on the circumferential surface of the lens;

said lens mount being formed by a mounting ring and said elastic elements;

said elastic elements being segments which in each case have a fixed end, connected to the mounting ring, and a free and which engages radially in the annular groove and holds the lens radially and axially;

wherein the segments are formations in the shape of circular segments on the inner circumference of the mounting ring which are slotted in the tangential direction and have at the center an attachment as free rend.

6. An elastic lens holder comprising:

a lens mount and a lens against whose circumferential surface elastic, pretensioned elements bear;

an annular groove being constructed on the circumferential surface of the lens;

said lens mount being formed by a mounting ring and said elastic elements;

said elastic elements being segments which in each case have a fixed end, connected to the mounting ring and a free end which engages radially in the annular groove and holds the lens radially and axially;

wherein the segments are arranged at the two end faces of the mounting ring, in order to hold two lenses with one lens mount.

7. The elastic lens holder as claimed in claim 6, wherein the segments are arranged at the two end faces of the mounting ring, in order to hold two lenses with one lens mount.

* * * * *